(12) United States Patent
Howard et al.

(10) Patent No.: US 9,217,628 B2
(45) Date of Patent: Dec. 22, 2015

(54) DETECTOR

(71) Applicants: Mark Anthony Howard, Worlington (GB); Darran Kreit, Foxton (GB)

(72) Inventors: Mark Anthony Howard, Worlington (GB); Darran Kreit, Foxton (GB)

(*) Notice: Subject to any disclaimer, the term of this patent is extended or adjusted under 35 U.S.C. 154(b) by 481 days.

(21) Appl. No.: 13/631,230

(22) Filed: Sep. 28, 2012

(65) Prior Publication Data

US 2013/0082692 A1    Apr. 4, 2013

(51) Int. Cl.
| | | |
|---|---|---|
| *G01B 7/14* | (2006.01) | |
| *G01B 7/00* | (2006.01) | |
| *G01D 5/20* | (2006.01) | |
| *G01D 5/22* | (2006.01) | |

(52) U.S. Cl.
CPC ............... *G01B 7/003* (2013.01); *G01D 5/202* (2013.01); *G01D 5/2266* (2013.01)

(58) Field of Classification Search
CPC ............ G01B 7/003; G01B 7/12; G01B 7/14; G01B 3/205; G01B 3/20; G01D 5/2266; G01D 5/202; G01D 5/2073; G01D 5/12; G01D 5/20; G01D 5/22; G01D 5/249; G01D 5/2086
USPC ............... 324/207.12–207.25; 340/870.32, 340/870.34; 336/15, 45
See application file for complete search history.

(56) References Cited

U.S. PATENT DOCUMENTS

| | | | | |
|---|---|---|---|---|
| 5,815,091 | A * | 9/1998 | Dames ................. | G01D 5/2073 324/207.17 |
| 6,011,389 | A * | 1/2000 | Masreliez et al. ....... | 324/207.17 |
| 6,329,813 | B1 * | 12/2001 | Andermo ............... | G01B 3/205 324/207.12 |
| 6,611,138 | B2 * | 8/2003 | Vasiloiu ............... | G01D 5/2053 324/207.12 |
| 7,239,130 | B1 * | 7/2007 | Milvich ............... | G01D 5/2086 324/207.12 |
| 2002/0030485 | A1 * | 3/2002 | Gleixner ................ | 324/207.17 |
| 2009/0284252 | A1 * | 11/2009 | Burgdorf et al. ........... | 324/207.2 |

FOREIGN PATENT DOCUMENTS

| | | |
|---|---|---|
| GB | 2115929 | 9/1983 |
| WO | WO 2004/036147 | 4/2004 |
| WO | WO 2006/079793 | 8/2006 |

* cited by examiner

*Primary Examiner* — Tung X Nguyen
*Assistant Examiner* — Thang Le
(74) *Attorney, Agent, or Firm* — Thorpe North & Western

(57) ABSTRACT

An inductive detector operable to measure displacement along a path comprises:
  a first inductive arrangement;
  a second inductive arrangement; said second inductive arrangement being spaced from said first inductive arrangement and extending along at least part of the measurement path;
at least one of said inductive arrangements comprises a winding which extends along at least part of the measurement path; and
said winding comprising at least four loops in electrical series;
wherein adjacent loops have opposite magnetic polarity; and the pitch distance of said winding varies at least once along the measurement path.

14 Claims, 6 Drawing Sheets

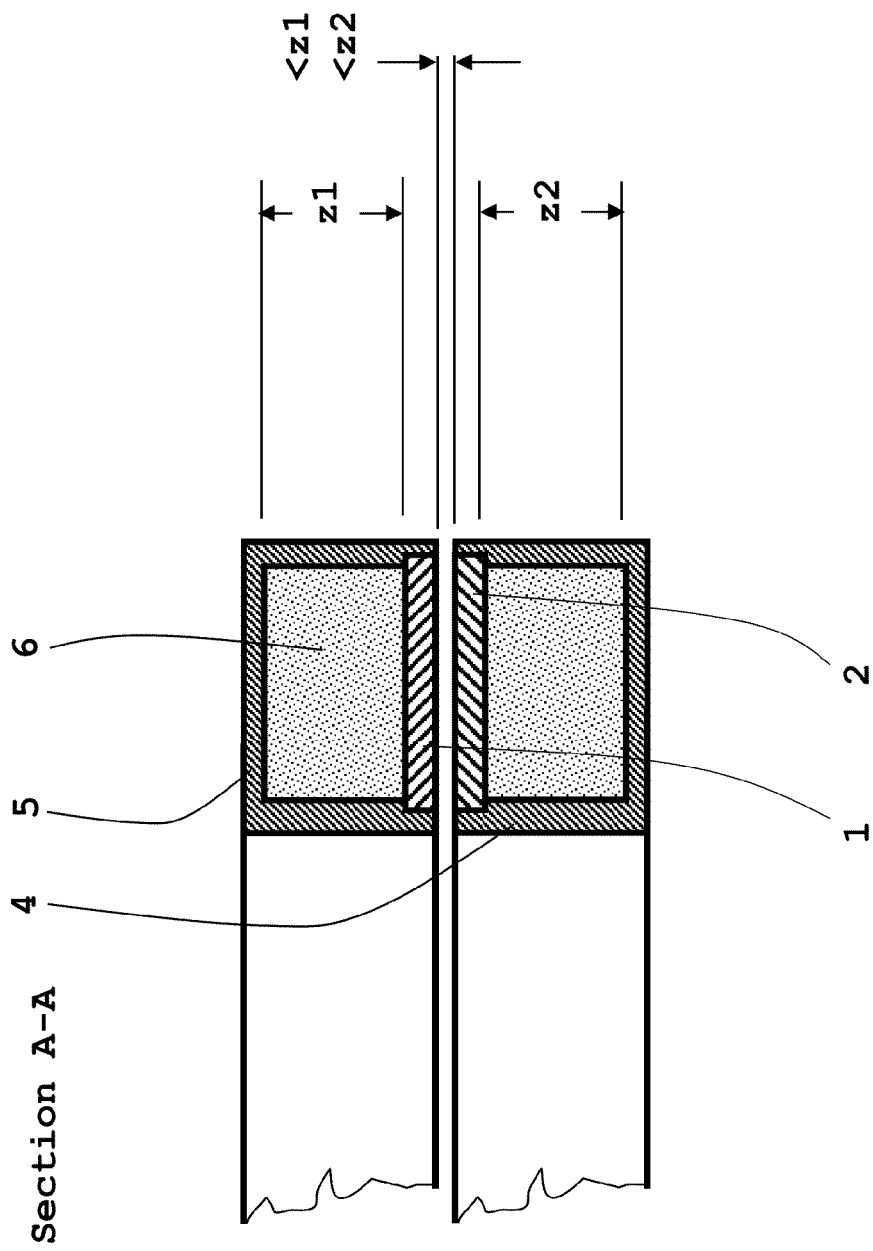

DETECTOR

PRIORITY CLAIM

This application claims priority to United Kingdom application Serial No. 1117201.2 filed on Oct. 4, 2011 and United Kingdom application Serial No. 1117909.0 filed on Oct. 17, 2011, both of which are hereby incorporated herein by reference in their entirety.

FIELD OF THE INVENTION

This invention relates to an inductive detector. In particular embodiments, the inductive detector is operable to measure the displacement of relatively moveable bodies.

BACKGROUND

The authors have previously disclosed various inductive displacement detectors. Typically, the displacement of an inductive target is measured relative to a laminar antenna comprising transmit and receive windings arranged along the measurement axis. The inductive coupling between the transmit and receive windings varies according to the position of the target. In some embodiments, the antenna extends along the measurement path and in others, the target extends along the measurement path. These prior art embodiments offer reliable operation; accurate measurement; various detection geometries and low production cost. Low costs are achieved because the laminar constructions are suited to printed circuit board (PCB) production techniques.

High resolution or high accuracy detectors typically require repeating winding pitches along the measurement path. Typically, to avoid the problem of position ambiguity, a series of fine pitch windings co-operate with a single coarse winding. Alternatively, a Vernier arrangement of windings can be deployed using a first and second series of windings with different pitches so that there is no common multiple over the measurement path. A further alternative is the use of Gray code winding patterns.

The common approach is the use of coarse and fine pitch windings. In practice, the number of fine pitch windings per coarse winding is limited and for high accuracy applications it is usual for there to be coarse, intermediate and fine pitch windings. Such PCB constructions are complex because of the need for multiple windings, multiple pitches, multiple turns (for reasons of good inductive coupling), multiple PCB layers and many plated via holes. Such complex constructions are also problematic. Firstly, PCBs with many layers and plated through holes, are expensive to produce. Second, the via holes distort the magnetic field and hence degrade measurement performance. Third, there is an inherent tolerance in the registration of the windings on one layer with the windings of another which causes a variation in the measurement accuracy between components. Fourth, the choice of PCB substrate materials suitable for multi-layer PCB, plated via constructions is limited. Fifth, separations between windings on different layers complicates detector design because the separations require compensation. Sixth, the thickness tolerance on mainstream PCB laminations is large (typically 10% of nominal) which causes further variation between products and batches. Seventh, plated via holes suffer from thermal fatigue and cracking due to thermal cycling. Eighth, via holes can from undesirable traps for bugs or foreign matter in hygiene related applications. Ninth, in small detectors large numbers of via holes are difficult to arrange and take up a large amount of available space. Tenth, in small, fine pitch detectors small diameter vias (<0.5 mm) are necessary which are expensive and difficult to produce. Eleventh, the area required for multiple Verniers or multiple very fine, fine and coarse windings makes the detectors large and expensive. Twelfth, there is electromagnetic interaction between the different sets of windings (such as the coarse and the fine windings) which degrades measurement performance.

SUMMARY OF THE INVENTION

In a first broad independent aspect, the invention provides an inductive detector operable to measure displacement along a path comprising:
  a first inductive arrangement;
  a second inductive arrangement; said second inductive arrangement being spaced from said first inductive arrangement and extending along at least part of the measurement path;
  at least one of said inductive arrangements comprises a winding which extends along at least part of the measurement path; and
  said winding comprising at least four loops in electrical series;
  wherein adjacent loops have opposite magnetic polarity; and the pitch distance of said winding varies at least once along the measurement path.

Preferably, the distance varies incrementally along the measurement path.

Preferably, the increments are of 1-2% along at least part of the measurement path.

Preferably, the measurement path is circular and the pitch distance incrementally decreases along a succession of winding portions along the measurement path from a portion of maximum pitch distance to a portion of minimum pitch distance; the maximum pitch distance portion and the minimum pitch distance portion being adjacent to one another.

In a preferred aspect, said inductive detector, operable to measure displacement along a path comprises: a first inductive target; a second inductively resonant target spaced along the measurement path from the first inductive target; a winding which extends along the measurement path comprising 4 loops in electrical series wherein adjacent loops have opposite magnetic polarity and the winding pitch distance varies along the measurement path.

Preferably, the pitch distance increases or decreases along the measurement path.

Preferably, the winding is laminar.

Preferably, one or both of said inductive arrangements are laminar.

Preferably, the loop polarity and pitch distance of the first winding forms a unique pattern over 4 loops.

Preferably, the winding forms a unique electromagnetic pattern.

Preferably, the detector comprises a second winding shifted along the measurement path from the first.

Preferably, the second winding comprises 4 loops in electrical series wherein adjacent loops have opposite magnetic polarity and the winding pitch distance along the measurement path varies at least once along the measurement path.

Preferably, the second winding is laminar.

Preferably, the loop polarity and pitch distance of the first winding and/or second winding forms a unique pattern over 4 loops.

Preferably, at least one of the windings is at least in part planar.

Preferably, the detector comprises a third winding which extends along at least part of the measurement path.

Preferably, said resonant circuits are resonant at different frequencies.

Preferably, the loops are formed by conductive tracks on an electrically insulating substrate.

Preferably, the measurement path is chosen from the list: linear, circular, curvi-linear.

Preferably, the distance between resonant circuits is fixed.

Preferably, the resonant circuits are spaced along the measurement path.

Preferably, the inductive detector has first and second laminar inductive targets which are attached to a metallic housing; the laminar winding is attached to a metallic housing; the gap between laminar inductive targets and laminar windings is less than the gap between metallic housing and the laminar targets and less than the gap between metallic housing and the laminar winding.

Preferably, said second inductive arrangement comprises at least two resonant circuits and the distance between first and second inductive resonant circuits is less than the shortest pitch distance of the winding of said first inductive arrangement.

Preferably, the first and second inductive arrangements are laminar and are attached to a metallic housing;
 the gap between the laminar inductive arrangements is less than the gap between metallic housing and the laminar arrangements.

In a further aspect, an inductive detector operable to measure displacement along a path comprises:
 a first inductive component;
 a second inductive component; said second inductive component being spaced from said first inductive component and extending along at least part of the measurement path;
 at least one of said inductive components comprises a winding which extends along at least part of the measurement path; and
 said winding comprising at least four loops in electrical series;
  wherein adjacent loops have opposite magnetic polarity; and the pitch distance of said winding varies at least once along the measurement path.

BRIEF DESCRIPTION OF THE DRAWINGS

In the accompanying drawings:

FIG. 6 shows a radial section through the arrangement of FIG. 5 and shows the relationship of the gaps between metallic housings, windings and targets.

DESCRIPTION OF A FIRST EMBODIMENT

The present invention provides in preferred embodiments a simple, compact and effective method and apparatus to enable absolute position measurement with high resolution and high accuracy. In certain embodiments, it provides particularly improved form/shape fitting. In certain embodiments, it allows much smaller total volumes and it may for example avoid the requirement of the prior art for a relatively coarse winding.

Figure 1:
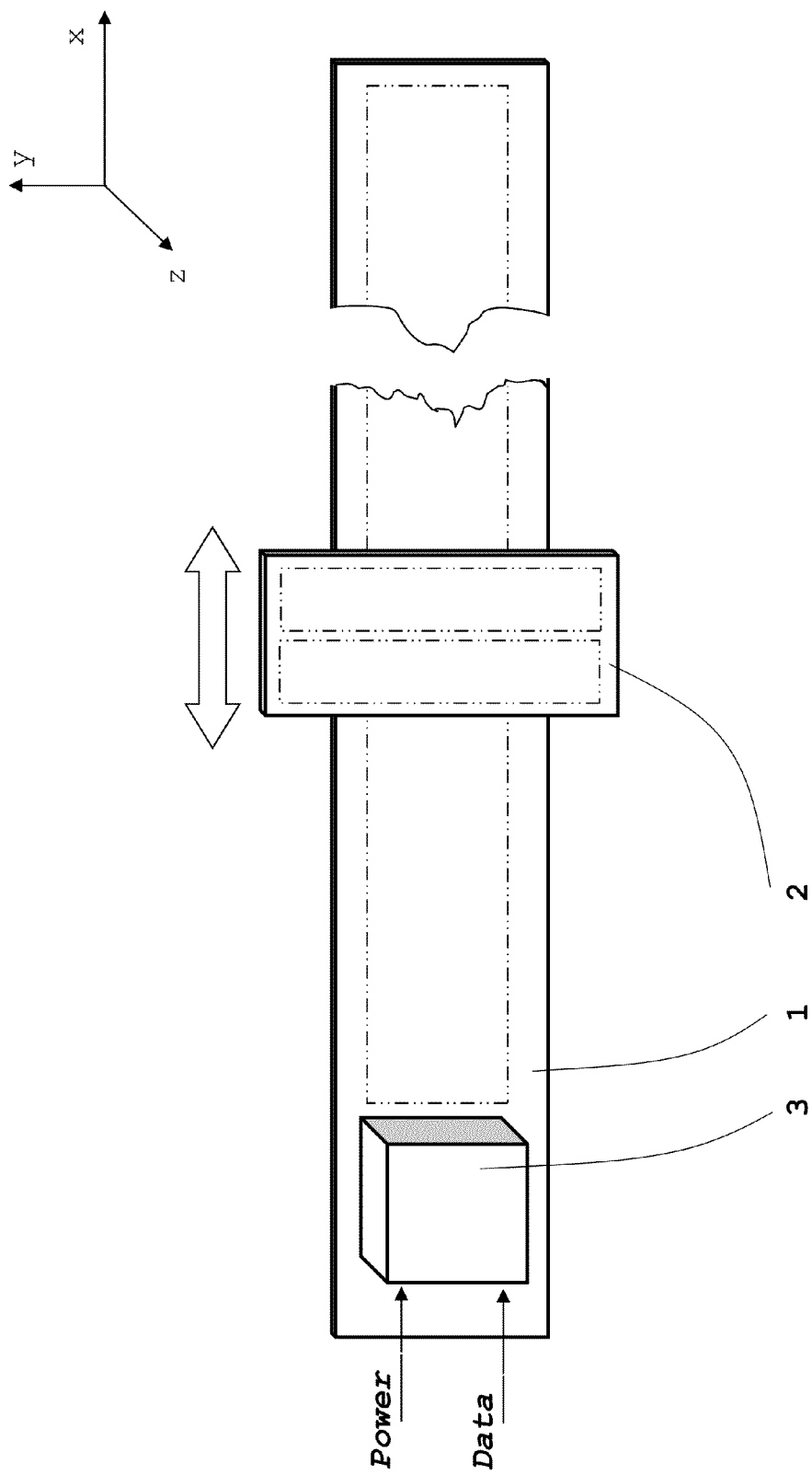
FIG. 1 shows a simplified, linear form of the detector.

FIG. 1 shows a simplified schematic of an embodiment of the invention as a detector to measure position along a linear measurement path (x-axis). A passive, laminar target [2] is arranged to face and travel along a laminar antenna [1]. An electronics circuit [3] receives power, energizes the antenna [1], receives signals from the antenna [1] and generates an output signal proportional to the distance of the target [2] along the antenna [1]. The antenna [1] is a laminar arrangement of windings preferably constructed as a multi-layer PCB.

Figure 2:
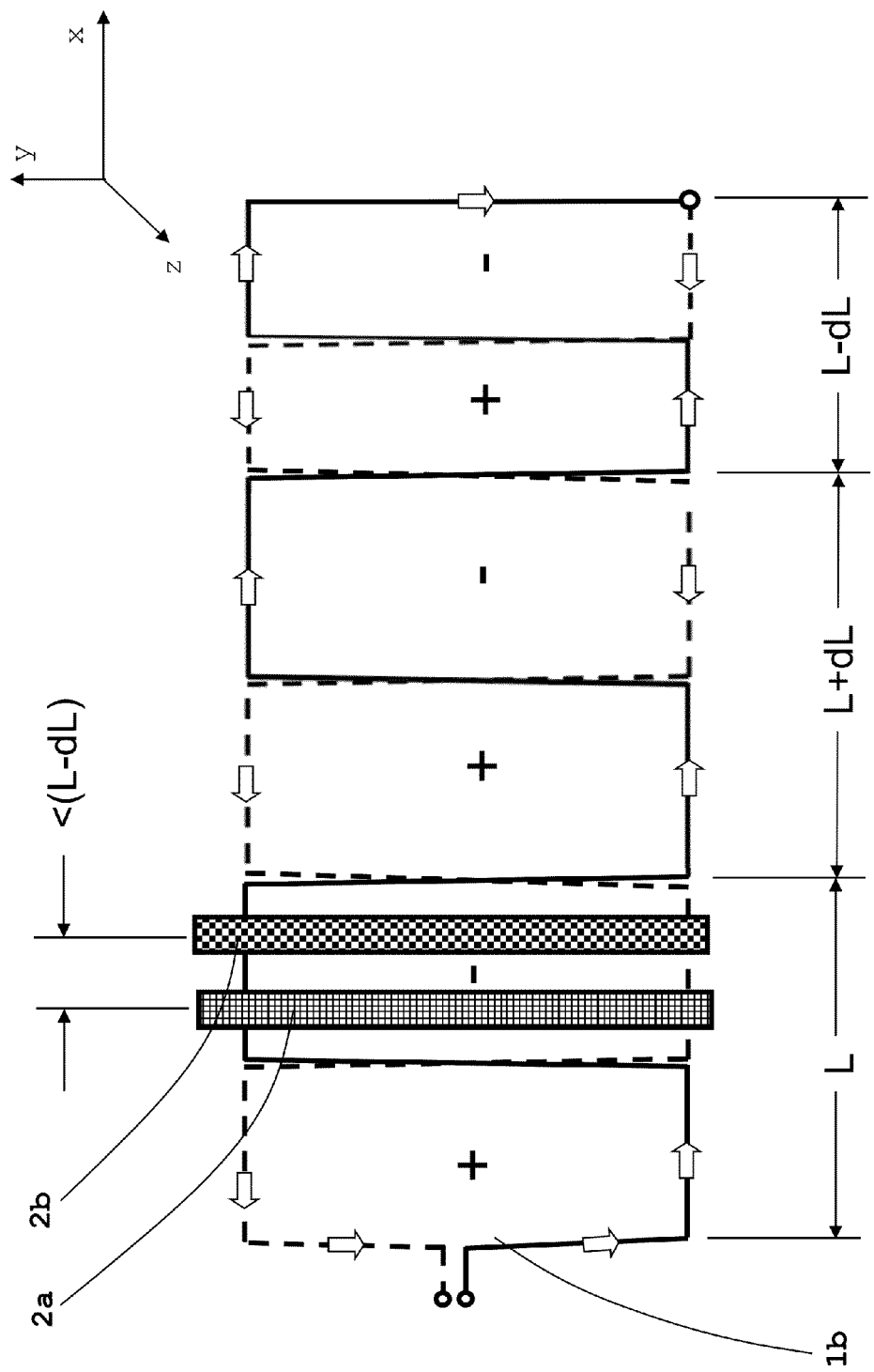
FIG. 2 shows a winding on a circuit board comprising 6 loops where the pattern of winding pitch distance and magnetic polarity of the loops forms a unique pattern along the measurement path (x-axis).

FIG. 2 shows a preferred arrangement of a receive winding [1b] which is formed by a first, outward conductor on an upper surface of a PCB which follows a serpentine path along the measurement axis. A conductor returns on the PCB's lower layer via a plated hole at the far end of the measurement path. The serpentine paths of the outward and return conductors are arranged to form a winding with a series of loops along the measurement axis. The series has adjacent loops with opposite magnetic polarity and a winding pitch (L, L+dL, L−dL) which varies along the measurement path. The resulting pattern of magnetic polarity and pitch distance is unique over the measurement path.

In most applications, where absolute position measurement is required, the pattern will be unique over the full measurement path. This pattern need not be unique along the full extent of the measurement path merely unique along that portion of the measurement path where absolute measurement is required.

Figure 3:
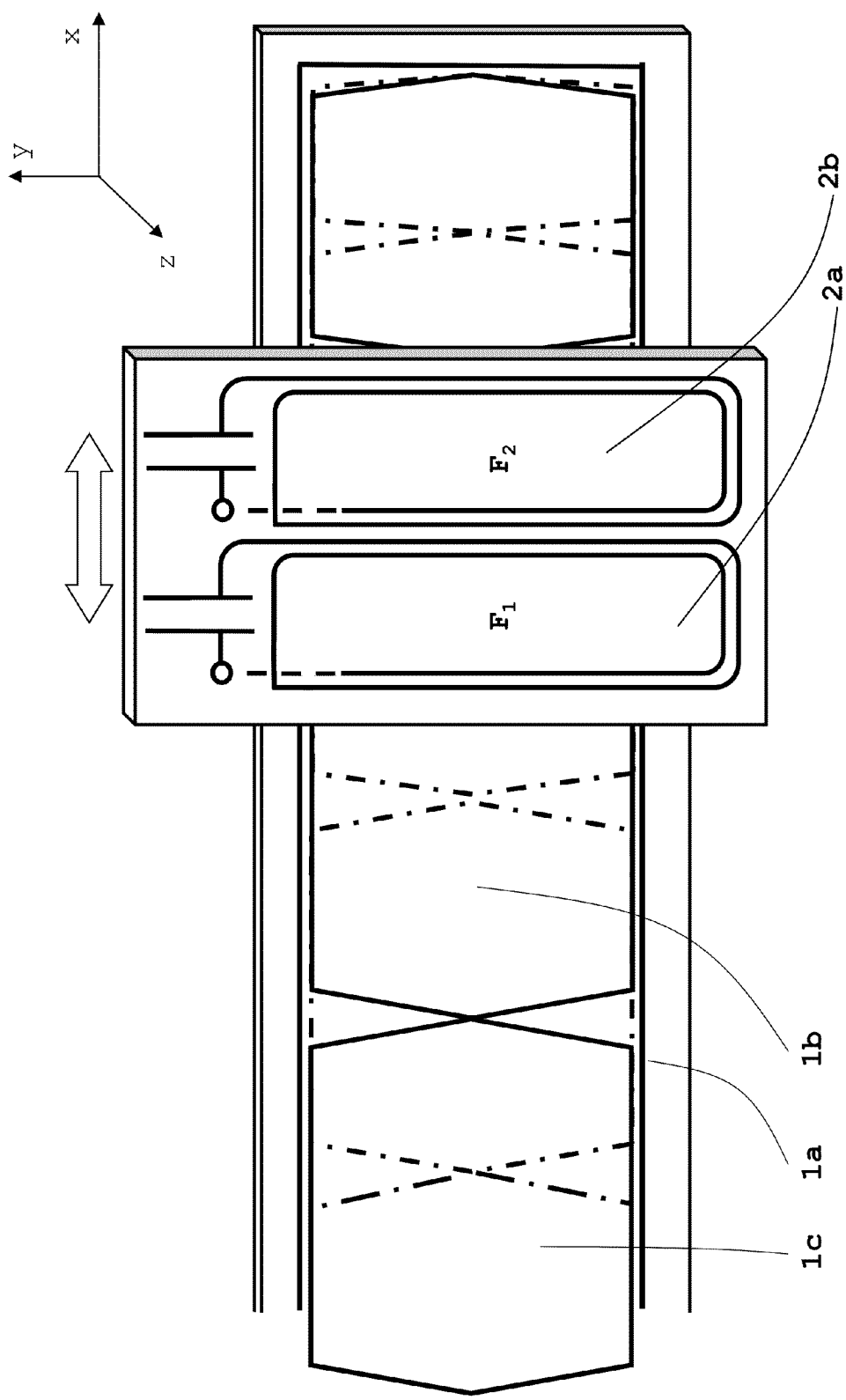
FIG. 3 shows two inductive targets arranged in relation to a portion of the antenna.

FIG. 3 shows a more detailed view of a target [2] in relation to an antenna [1]. A transmit winding [1a] encompasses the receive windings [1b & 1c]. For illustrative purposes, in this instance, the receive windings [1b & 1c] are shown with hexagonal rather than rectangular forms. Advantageously, one receive winding is shifted along the measurement axis so as to form sinusoidal and cosinusoidal windings. Preferably, the target [2] comprises 2 resonant circuits [2a & 2b] spaced along the measurement path. Each resonant circuit comprises a laminar winding, which forms an inductor, and a capacitor in electrical series. Preferably, the resonant circuits are constructed on a PCB.

The transmit winding [1a] is energized with two AC frequencies. The energization of the two frequencies may be concurrent or, first one frequency, then the other and so on. The first frequency is at substantially the first target's [2a] resonant frequency. The second frequency is at substantially the second target's [2b] resonant frequency. Preferably, resonant frequencies in the range 100 kHz to 10 MHz are used. Preferably, frequencies are chosen so that there are no common harmonics. Currents are induced to flow in the targets [2a & 2b] which, in turn, produce their own electromagnetic fields which are detected by the receive windings [1b & 1c]. As the targets [2a & 2b] move along the antenna [1], the mutual inductance between the transmit winding [1a] and the receive windings [1b & 1c] varies. The receive windings [1b & 1c]—which form a sinusoidal and cosinusoidal winding pattern—enables calculation of position of either target (within a winding pitch) by ratiometric voltage measurement of the received voltages. Such techniques are well known to those skilled in the art of inductive detectors such as LVDTs and resolvers. Such methods operating with laminar inductive detectors have been previously disclosed by the authors. Given that the magnetic polarity and pitch distance of the receive windings [1b & 1c] is unique but the distance between the targets along the measurement axis is fixed then the variation in the relationship of the two signals will be unique—thus enabling calculation of absolute position measurement over the multi-pitch winding arrangement.

By way of example, we can consider the two targets [2a & 2b] spaced apart by L/4 or 90° if we consider a winding pitch L equivalent to 360°. If the calculated positions of the targets [2a & 2b] differ by L/4 or 90° this indicates that the targets are in the area with winding pitch L. Overall position can be calculated by the distance of the start of the L/4 winding along the measurement path plus the distance of the first target along the winding of pitch L.

If the calculated positions of the targets [2a & 2b] differ by >L/4 or >90° this indicates that the targets are in the winding loops of pitch L−dL.

If the calculated positions of the targets [2a & 2b] differ by <L/4 or <90° this indicates that the targets are in the winding loops of pitch L+dL.

Figure 4:
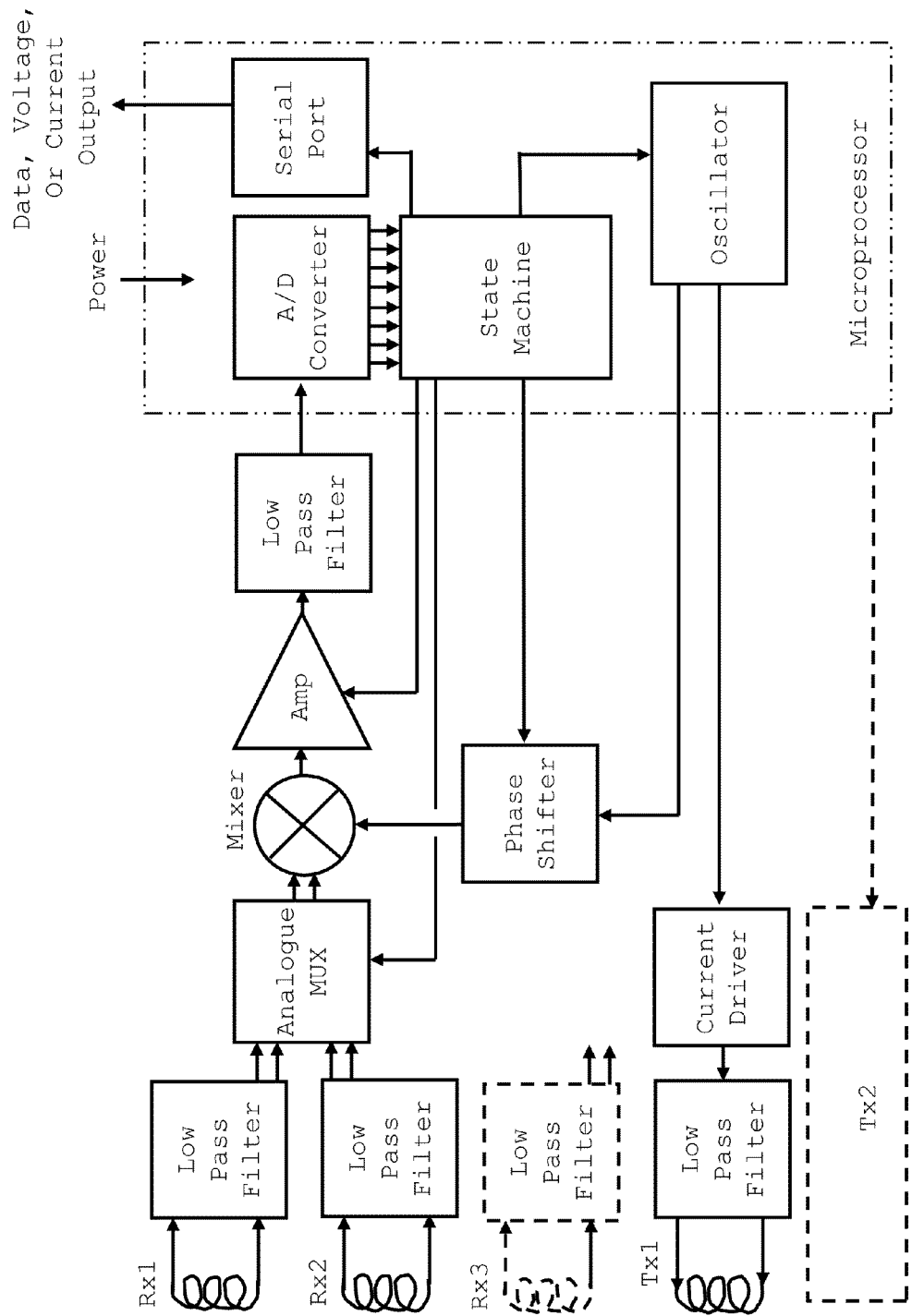
FIG. 4 shows a schematic of the electronic circuit.

FIG. 4 shows a schematic of the electronic circuit used with the preferred embodiment. RX refers to the receive winding [1b & 1c] and TX refers to the transmit winding [1a].

DESCRIPTION OF ALTERNATIVE EMBODIMENTS

The invention is not limited to measuring linear displacement. If the target and antenna are bent around an axis, embodiments of the invention can measure rotation. Further arrangements may be used for curvi-linear, 2-dimensional, cylindrical, roll, pitch and yaw measurement. Embodiments of the invention have particular utility in absolute angle measurement in rotary versions.

The conductor paths on the target or antenna need not be rectangular or hexagonal. The paths may be sinusoidal, triangular, semi-circular or other such shape. Other higher harmonic components may be added to the sinusoidally varying part of the target or antenna to improve linearity. The loops may be formed using multiple turns and the density of the turns may be expanded or contracted to produce linear position measurement.

The preferred embodiment uses two resonant targets. Non-resonant targets may also be employed. Non-resonant targets are generally not preferred since they do not generate such high quality signals but they are more readily manufactured from a wide range of conductive materials such as copper, aluminium etc. or a shorted turn.

The antenna may be simplified when embodiments of the invention are used in a pulse echo mode. In pulse echo mode, a multi-pitch winding [1b & 1c] is energised with an AC signal during transmit and then switched off to receive the signal from the resonating targets. In other words, the winding is both a transmit and a receive winding. 2 windings [1b & 1c], with known separation along the measurement axis, are required for ratiometric measurement and there is no need for electrical balancing.

An alternative embodiment uses the receive windings as transmit windings and the transmit winding as a receive winding. The (resulting) transmit windings are energised with AC signals whose amplitude is modulated by a lower frequency and in phase quadrature. The excitation frequency is substantially the same frequency as the resonant frequency of each target [2a and 2b]. The phase of the signal of the modulation frequency in the receive winding [1c] compared to the phase of the modulation frequency in the transmit windings [1a and 1b] indicates position. This is not preferred since it is relatively slow and more susceptible to incoming electromagnetic noise.

The preferred winding pattern may be used in combination with other winding patterns, for example, repetitive fine pitch windings of constant pitch, for very high resolution measurement. In such instances, it may be the case that the pattern of magnetic polarity and pitch distance repeats over the measurement path, forming a Vernier combination with a repetitive finer pitch winding.

In a further embodiment, the receive windings are not located on top of each other but rather side by side. Although less compact in some applications, such an arrangement may use fewer layers and via holes. This is advantageous since less expensive substrates may be used such as paper or polyester film or high stability substrates such as glass or ceramic.

Space efficiency may be improved by interdigitating the windings.

Thus far, antennae have been described with co-planar transmit and receive windings. This is preferable but not necessary. The windings may be, for example, placed on either side of the target [2]. Alternatively the two targets [2a & 2b] may be placed on either side of the antenna [1]. Such constructions may be useful, for example, when mechanical guidance is required.

Multiple antennae can be controlled by an electronic circuit using time division multiplexing.

Connections between antenna and electronics can be made by a transformer construction so that the antenna may move freely without trailing electrical wires and connections.

Figure 5:
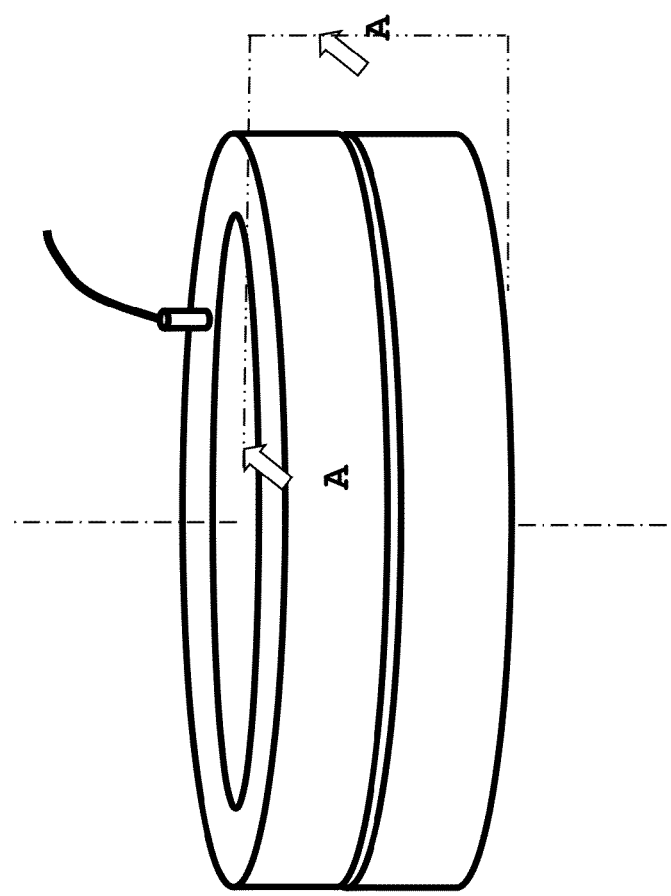
FIG. 5 shows a rotary version of an embodiment of the invention in a mechanical housing.

Embodiments of the invention have particular utility in high resolution measurement of absolute angle. Applications often require a detector with low axial height and low annular thickness as shown in FIGS. 5 & 6. The target and antenna are advantageously housed in an aluminium, steel or similar housing. In such arrangements, the target [2] and antenna [1] must be housed so that the metallic housings doe not provide leakage paths for the electromagnetic field and hence reduce signal strengths. This is achieved by an arrangement whereby the gap between the target [2] and antenna [1] is less than the gaps [z1 & z2] between the metallic housing (4, 5) and target [2] or antenna [1].

The detectors can be used as a non-contact method of transmitting switch status by arranging a switch in series with either target's [2a or 2b] capacitor and inductor. Currents will either flow or not in the target depending on the switch position. Consequently, a signal will or will not be received by the antenna. Data regarding multiple switches may be provided by using multiple resonant circuits of different frequencies. Alternatively, the switches can be used to switch in other capacitors or inductors so as to alter the natural frequency of the target. In some applications it may be undesirable to use a switch in the target, e.g. in wet environments. In such instances data may be provided by varying the inductance of the inductor in the target. A magnetically permeable element may be arranged to displace relative to the inductor, thus causing a shift in the resonant frequency.

Changing the resonant target's capacitor or inductor will change its natural frequency. This can be used as an identification technique. A combination of different resonant frequencies increases the number of identities. Large numbers of identities can be encoded with the use of multiple targets and 2-dimensional (in x & y-axes) sensing of their relative displacement.

Detectors may be arranged to measure torque. In one embodiment, two targets are attached to points along a rotating shaft. The shaft passes through the centre of the antennae which are arranged to measure rotary position of their respective targets. The position of both targets is measured as the shaft rotates and any relative shift is proportional to the applied torque.

Detectors may be constructed to carry out a self check. The electronic circuit can, of course, detect simple faults such as open circuits etc. but a self check can be made by measuring the position of a target which is fixed to the antenna. If the fixed target appears to have moved a fault is indicated.

Preferably, any material between target and antenna is an insulator. A conductive barrier can be placed in between so long as the transmit or resonant frequency is low enough to allow the signals to penetrate the skin depth. Preferably, a conductive barrier has a relatively low magnetic permeability, e.g. non-magnetic stainless steel.

Accurate measurement may be needed in extreme temperatures where thermal expansion or contraction of the antenna or target may lead to measurement error. Compensation can be made by measuring the temperature and modifying the position measurement. Preferably, the resistance of one of the antenna windings is used to measure temperature.

PCBs need not necessarily be used as the manufacturing technique for the targets and antenna. Wire windings, printed conductive inks or plated conductive tracks may be used.

There are many applications for the invention including, but not limited to: actuators, aileron controls, angle sensors, radar antenna tracking, anti-counterfeit devices, audio controls, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, Inductosyn replacements, industrial control panels, joysticks, kitchen goods, lifts, lighting controls, limit switch replacements, linear actuators, liquid level sensors, load sensors, LVDT replacements, machine tools, magnetostrictive sensor replacements, marine drives, marine controls, marine engines, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, user interface elements, utility meters, valves, velocity sensors, vibration sensors, washing machines, weight sensors, wheel sensors, workpiece identification.

The invention claimed is:

1. An inductive detector operable to measure displacement along a path comprising:
a first inductive arrangement;
a second inductive arrangement; said second inductive arrangement being spaced from said first inductive arrangement and extending along at least part of the measurement path;
at least one of said inductive arrangements comprising a winding which extends along at least part of the measurement path, said winding comprising at least four loops in electrical series;
wherein adjacent loops of said winding have opposite magnetic polarity;
the pitch distance of said winding varies at least once along the measurement path, wherein said pitch distance increases along the measurement path or decreases along the measurement path or varies incrementally along the measurement path; and
the other of said inductive arrangements comprises at least two targets separated by a distance which is fixed.

2. An inductive detector according to claim 1, wherein the measurement path is circular and the pitch distance incrementally decreases along a succession of winding portions along the measurement path from a portion of maximum pitch distance to a portion of minimum pitch distance; the maximum pitch distance portion and the minimum pitch distance portion being adjacent to one another.

3. An inductive detector according to claim 1, wherein at least one of said inductive arrangements is laminar.

4. An inductive detector according to claim 1, wherein said winding is laminar.

5. An inductive detector according to claim 1, comprising a first winding and a second winding; said second winding being shifted along the measurement path relative to said first winding.

6. An inductive detector according to claim 5, wherein said second winding comprises at least four loops in electrical series wherein adjacent loops have opposite magnetic polarity and the pitch distance varies at least once along the measurement path.

7. An inductive detector according to claim 1, wherein the loop polarity and pitch distance of at least one winding forms a unique pattern over four loops.

8. An inductive detector according to claim 1, wherein at least one winding is at least in part planar.

9. An inductive detector according to claim 1, further comprising a second winding and a third winding; said third winding extending along at least part of the measurement path.

10. An inductive detector according to claim 1, wherein the measurement path is chosen from the list: linear, circular, and curvi-linear.

11. An inductive detector according to claim 1, wherein each of said targets consist of a resonant circuit, and the distance between said resonant circuits is fixed.

12. An inductive detector according to claim 11, wherein said resonant circuits are resonant at different frequencies.

13. An inductive detector according to claim 11, wherein the distance between first and second inductive resonant circuits is less than the shortest pitch distance of the winding of said first inductive arrangement.

14. An inductive detector according to claim 1, wherein:
the first and second inductive arrangements are laminar and are attached to a metallic housing;
a gap is provided between the laminar inductive arrangements; and a gap is provided between the metallic housing and the laminar arrangements;

wherein said gap between the laminar inductive arrangements is less than said gap between metallic housing and the laminar arrangements.

* * * * *